Patented Aug. 7, 1934

1,969,447

UNITED STATES PATENT OFFICE 1,969,447

8 ARYL-DIBENZOTHIOCARBOCYANINE AND METHOD OF PREPARING IT

Leslie G. S. Brooker, Rochester, N. Y., assignor to Eastman Kodak Company, Rochester, N. Y., a corporation of New York No Drawing. Application February 27, 1933, Serial No. 658,837

14 Claims. (Cl. 260—44)

This invention relates to dibenzothiocarbocyanine dyes substituted in the 8 position by an aryl or substituted aryl group, and methods for their preparation. These dyes are useful as photographic sensitizers.

This application is in part a continuation of my co-pending application Serial No. 520,461, filed March 5, 1931, in which these dyes are described and generically claimed. The instant application is directed more specifically to the dibenzo species of thiocarbocyanines. Similarly, these dibenzothiocarbocyanines are described in my Patents Nos. 1,846,301 and 1,846,304, with which my above application Serial No. 520,461, was co-pending. These dibenzothiocarbocyanines are also referred to in my co-pending application, Serial No. 435,105, filed March 12, 1930.

An object of the present invention, therefore, is to provide dibenzothiocarbocyanine dyes having aryl, or substituted aryl, substituents attached to the central carbon atom of the three-carbon chain of the dye. A further object of the invention is to provide methods for preparing these dyes. Other objects will hereinafter appear.

These dyes are prepared by condensing a mu-methyl naphthothiazole alkyl quaternary salt, i. e. a 1-methyl-α- or 2-methyl-β-naphthothiazole alkyl quaternary salt with an ortho-ester of an aromatic carboxylic acid. Ortho-esters of aromatic carboxylic acids which have been found successful include such esters as triethyl or trimethyl ortho-benzoate and ortho-para-toluate.

The aromatic acids whose trialkyl ortho-esters are employed may be further described as possessing an aryl group directly linked to the carbon atom of the carboxyl group. This aryl group may be unsubstituted, as for example the phenyl group, or substituted as for example the p-tolyl group. In this latter example the aryl group (phenyl) is seen to be substituted by an alkyl group (methyl) but substituents other than alkyl groups may be employed, such as for instance, alkoxy.

The reaction of a mu-methyl naphthothiazole alkyl quaternary salt with one of these ortho-esters of a carboxylic acid, in the presence of a suitable organic base, such for example as pyridine, may be written graphically as follows—

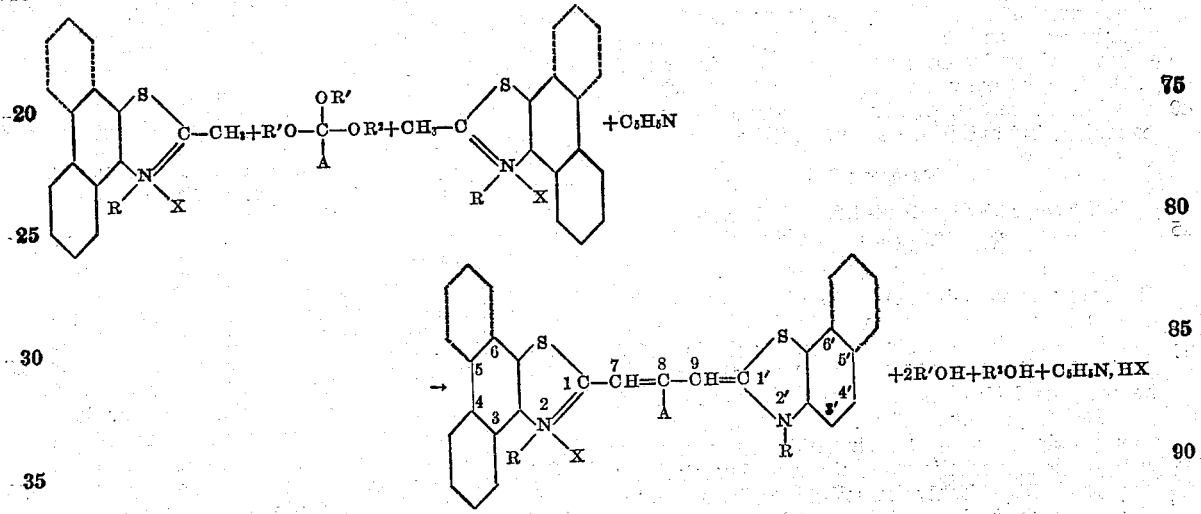

In the above structure R represents an alkyl group and X an acid radical. A stands for the aryl (or substituted aryl) group to be introduced into the three-carbon chain of the thiocarbocyanine dye and OR' and OR² represent the alkoxy groupings of the ortho-ester and these may be similar or dissimilar. The fused-on benzene ring may be in the 3:4 position, as shown in solid lines, or in the 5:6 position, as shown in dotted lines. The dye molecule is numbered as shown, so that a compound of this type may be described as a 2:2'-dialkyl-8-aryl (unsubstituted or substituted) dibenzothiocarbocyanine salt.

In actual practice it is frequently desirable to carry out the condensation with an acid radical such as the p-toluene-sulfonate, which confers a comparatively high degree of solubility on the μ-methylnaphthothiazole alkyl quaternary salt and on the dye. The latter is then conveniently isolated as a less soluble salt by double-decomposition in the ordinary way, such salts as ammonium or potassium bromide or iodide being employed for this purpose, usually in aqueous solution.

The grouping —CH= is called the methenyl group and, therefore, the chain —CH=CH—CH= may be called a tri-methenyl chain, and the chain

may similarly be called a trimethenyl chain in which the hydrogen attached to the central carbon atom has been replaced by the group denoted by the letter A, which is an aryl or substituted aryl group.

The nomenclature and numbering of the above classes of compounds and intermediates are in accord with present usage and also the system used in my co-pending applications given above. The numbering, of course, is arbitrary and is given for the guidance of those skilled in the art, in order that there be no question as to the identity of a compound covered by my invention.

The methods for the preparation of the mu-methyl-naphthothiazole alkyl quaternary salts are given in the literature and are further amplified in my Patents Nos. 1,846,300 and 1,846,301. The preparation of the ortho-esters of the aromatic carboxylic acids are either described in the literature or further described in my parent application, Serial No. 520,461.

I will now give several examples for preparing various dyes referred to, but it will be understood that they are merely representative of a great number of reactions in which the proportions given and equivalents used may vary in accord with the particular type of dye required. My invention, therefore, will not be restricted thereby, except as indicated in the appended claims.

Example I

*8-phenyl-2,2'-dimethyl-3,4,3',4'-dibenzothiocarbocyanine bromide*

19.3 parts (2 mols.) of 2-methyl-β-naphthothiazole metho p-toluenesulfonate (prepared by condensing the base with methyl p-toluenesulfonate and recrystallizing the product), 11.2 parts (2 mols., i. e. 100% excess) of ethyl orthobenzoate and 40 parts of dry pyridine are refluxed together for 1 hour. The dye which was formed was precipitated as the bromide by adding a warm aqueous solution of potassium bromide (20 g. in 100 cc.). The dye was filtered off when cold, treated with boiling acetone (200 cc., 200 cc., 200 cc.,) to remove impurities and finally recrystallized from methyl alcohol. The pure dye crystallized in minute dull greenish brown crystals which dissolved in methyl alcohol with a beautiful violet-blue coloration.

Example II

*8-phenyl-2,2'-diethyl-5,6,5',6'-dibenzothiocarbocyanine bromide*

10 parts (2 mols.) of 1-methyl-α-napthothiazole etho-p-toluenesulfonate, 5.6 parts (2 mols., i. e. 100% excess) of ethyl ortho-benzoate and 15 parts of pyridine are boiled under reflux for 30 minutes. The deep blue solution is allowed to cool and the dye precipitated by adding excess of ether (100 parts) and decanting the ethereal layer off. The residue is then dissolved in hot methyl alcohol and excess of aqueous potassium bromide added. The dye is precipitated as the bromide and is removed by filtration and washed with water and then acetone. The dye is recrystallized from methyl alcohol and is obtained as a dull bluish gray powder, which gives a violet-blue solution in the solvent.

If 2 mols. of 2-methyl-β-naphthothiazole etho-p-toluenesulfonate are substituted for the quaternary salt used above, the reaction being carried out as before, the dye obtained is 8-phenyl-2,2'-diethyl-3,4,3',4'-dibenzothiocarbocyanine bromide, which dissolves with about the same color in methyl alcohol.

By substituting various unsubstituted or substituted aryl groups in the position in the structural formula of the dye occupied by the letter A, and alkayl groups in the two positions occupied by the letter R, many sensitizing dyes may be obtained. The letter X indicates any suitable anion such, for example, as a halide, p-toluenesulfonate, alkylosulphate, nitrate, acetate, perchlorate, or, in fact, any salt forming anion that will not render the dye too sparingly soluble or deleteriously affect the photographic sensitizing properties of the dye.

It is apparent from a consideration of the above, that the naphthothiazole nucleus may be substituted in the various available positions in the two benzene rings and that such substitution comes within the scope of the appended claims, inasmuch as the preparation of the substituted naphthothiazole quaternary salts are known to those skilled in the art. Furthermore, since I have described the use of an aryl group as a substituent in the 8-position, and the use of ortho-esters of aromatic monobasic acids, it will be apparent that my invention includes under the term (1) an aryl group or (2) an aromatic monobasic carboxylic acid, respectively (1) both an unsubstituted and a substituted aryl group or (2) an aromatic monobasic carboxylic acid having an unsubstituted aryl group directly linked to the carbon atom of the carboxyl group and an aromatic monobasic carboxylic acid having a substituted aryl group linked directly to the carbon atom of the carboxyl group. These substituents in the aryl group may, of course, contain elements other than carbon and hydrogen. While I have described pyridine as the preferred solvent for carrying out this reaction, it will be understood that I may employ any organic base which is a solvent for the reacting constituents and which also acts to bind acid eliminated by the reaction. This organic base should, of course, not suppress the reaction itself. Also, while I have described the reaction as taking place with the greatest efficiency under the influence of heat, it will be understood that the reaction will take place to a degree even at room temperature, particularly upon long standing. Accordingly, it will be understood that the process is not limited to one in which heat must necessarily be employed.

While the principal use now known for these new chemical compounds is for sensitizing photographic emulsions, it may well be that other uses therefor will be discovered from time to time and, consequently, it is not intended that the reference herein to the sensitizing of these dyes shall, in any way, limit the scope of the claims appended hereto.

What I claim as my invention, and desire to be secured by Letters Patent of the United States is:

1. A 2,2'- dialkyl - 8-aryldibenzothiocarbocyanine salt the aryl radical being of the benzene series.

2. A 2,2'-dialkyl-8-phenyldibenzothiocarbocyanine salt.

3. A 2,2'-dialkyl-8-phenyldibenzothiocarbocyanine halide.

4. A 2,2'-dialkyl-8-phenyldibenzothiocarbocyanine iodide.

5. An 8-aryl-2,2'-dialkyl-3.4,3',4'-dibenzothiocarbocyanine salt the aryl radical being of the benzene series.

6. An 8-aryl-2,2'-dialkyl-3,4,3',4'-dibenzothiocarbocyanine halide the aryl radical being of the benzene series.

7. An 8-aryl-2,2'-dialkyl-3,4,3',4'-dibenzothiocarbocyanine bromide the aryl radical being of the benzene series.

8. An 8-aryl-2,2'-dialkyl-5,6,5',6'-dibenzothiocarbocyanine salt the aryl radical being of the benzene series.

9. An 8-aryl-2,2'-dialkyl-5,6,5',6'-dibenzothiocarbocyanine halide the aryl radical being of the benzene series.

10. An 8-aryl-2,2'-dialkyl-5,6,5',6'-dibenzothiocarbocyanine bromide the aryl radical being of the benzene series.

11. The process of preparing dibenzothiocarbocyanines which comprises condensing a mu-methyl-naphthothiazole alkyl quaternary salt with a trialkyl ortho-ester of an aromatic monobasic carboxylic acid of the benzene series in the presence of an organic base which is a solvent for the reacting constituents and acts to bind acid eliminated from the quaternary salt as a result of the condensation.

12. The process of preparing dibenzothiocarbocyanines which comprises condensing, under the influence of heat, a mu-methyl-naphthothiazole alkyl quaternary salt with a trialkyl ortho-ester of an aromatic monobasic carboxylic acid of the benzene series in the presence of an organic base which is a solvent for the reacting constituents and acts to bind acid eliminated from the quaternary salt as a result of the condensation.

13. The process of preparing dibenzothiocarbocyanines which comprises condensing a mu-methyl-naphthothiazole alkyl quaternary salt with a trialkyl ortho-ester of benzoic acid in the presence of pyridine.

14. The process of preparing dibenzothiocarbocyanines which comprises condensing a mu-methyl-naphthothiazole alkyl quaternary salt with triethyl-ortho-benzoate in the presence of pyridine.

LESLIE G. S. BROOKER.